(12) United States Patent
Hicks et al.

(10) Patent No.: US 9,464,003 B2
(45) Date of Patent: Oct. 11, 2016

(54) METHOD OF PRODUCING A COMPOSITE MATERIAL USING A MIXING SYSTEM

(75) Inventors: Steven Hicks, Brownstown, MI (US); David Kenneth Bower, Canton, MI (US); William G. Handlos, Manitowoc, WI (US); Joe Kaul, Lakewood, CO (US); Brian T. Arnott, Tomahawk, WI (US)

(73) Assignees: BASF SE, Ludwigshafen (DE); LARIAT HOLDINGS, LLC, Columbia, MO (US)

( * ) Notice: Subject to any disclaimer, the term of this patent is extended or adjusted under 35 U.S.C. 154(b) by 285 days.

(21) Appl. No.: 13/380,327

(22) PCT Filed: Jun. 24, 2010

(86) PCT No.: PCT/EP2010/058989
§ 371 (c)(1),
(2), (4) Date: Apr. 16, 2012

(87) PCT Pub. No.: WO2010/149737
PCT Pub. Date: Dec. 29, 2010

(65) Prior Publication Data
US 2012/0189389 A1    Jul. 26, 2012

Related U.S. Application Data

(60) Provisional application No. 61/220,118, filed on Jun. 24, 2009.

(51) Int. Cl.
*E01C 3/06* (2006.01)
*E01C 19/00* (2006.01)
(Continued)

(52) U.S. Cl.
CPC .............. *C04B 26/16* (2013.01); *E01C 7/30* (2013.01); *E01C 19/45* (2013.01); *C04B 2111/60* (2013.01)

(58) Field of Classification Search
CPC ......... E01C 7/30; E01C 19/45; C04B 26/16; C04B 2111/60
USPC ...................... 404/32, 82, 101, 72; 366/76.6
See application file for complete search history.

(56) References Cited

U.S. PATENT DOCUMENTS 3,240,736 A    3/1966    Beckwith
3,272,098 A    9/1966    Buchholtz et al.
(Continued)

FOREIGN PATENT DOCUMENTS

CA    2037214 A1    9/1991
CN    1609340 A     4/2005
(Continued)

OTHER PUBLICATIONS

English language abstract for EP 0911304 extracted from the espacenet.com database on Aug. 23, 2012, 9 pages.
(Continued)

*Primary Examiner* — Abigail A Risic
(74) *Attorney, Agent, or Firm* — Howard & Howard Attorneys PLLC (57) ABSTRACT

A method produces a composite material using a mixing system. The composite material comprises at least one aggregate, e.g. rock and/or glass, and the reaction product of a two-component polymeric binder composition comprising a first component, e.g. an isocyanate component, and a second component, e.g. an isocyanate-reactive component. The mixing system includes a mixing apparatus. The method includes the step of providing the aggregate, the first component and the second component into the mixing apparatus. The method further includes the step of mixing the first and second components to produce the reaction product of the two-component polymeric binder composition, and the step of applying the reaction product of the two-component polymeric binder composition to the aggregate within the mixing apparatus to produce the composite material. The composite material can be used for forming a paved structure, such as a sidewalk or a roadway.

18 Claims, 2 Drawing Sheets

(51) Int. Cl.
  *E01C 7/30* (2006.01)
  *C04B 26/16* (2006.01)
  *E01C 19/45* (2006.01)
  *C04B 111/60* (2006.01)

(56) References Cited

U.S. PATENT DOCUMENTS

| | | | |
|---|---|---|---|
| 3,396,644 A * | 8/1968 | Banks | 404/105 |
| 3,577,893 A | 5/1971 | Towner | |
| 3,690,021 A | 9/1972 | Glass et al. | |
| 3,690,227 A | 9/1972 | Welty | |
| 3,711,444 A | 1/1973 | Allen et al. | |
| 3,850,537 A | 11/1974 | Bynum, Jr. | |
| 3,909,474 A | 9/1975 | Borchert et al. | |
| 3,911,667 A | 10/1975 | Komiyama | |
| 3,958,891 A | 5/1976 | Eigenmann | |
| 4,021,401 A | 5/1977 | Jeppsen | |
| 4,063,839 A | 12/1977 | Brown | |
| 4,076,917 A | 2/1978 | Swift et al. | |
| 4,097,423 A | 6/1978 | Dieterich | |
| 4,112,176 A | 9/1978 | Bailey | |
| 4,114,382 A | 9/1978 | Kubens et al. | |
| 4,139,676 A | 2/1979 | Janssen et al. | |
| 4,247,933 A | 1/1981 | Nakamura | |
| 4,271,493 A | 6/1981 | Tamaru et al. | |
| 4,433,701 A | 2/1984 | Cox et al. | |
| 4,441,821 A * | 4/1984 | Burkhart et al. | 366/61 |
| 4,452,551 A | 6/1984 | Arndt et al. | |
| 4,550,153 A | 10/1985 | Carver | |
| 4,559,239 A | 12/1985 | Cenegy | |
| 4,630,963 A | 12/1986 | Wyman | |
| 4,659,748 A | 4/1987 | Boddie | |
| 4,761,099 A | 8/1988 | Mann et al. | |
| 4,792,262 A | 12/1988 | Kapps et al. | |
| 4,797,026 A | 1/1989 | Webster | |
| 4,922,463 A | 5/1990 | Del Zotto et al. | |
| 5,001,190 A | 3/1991 | Carpenter et al. | |
| 5,043,955 A | 8/1991 | Dubois et al. | |
| 5,044,819 A * | 9/1991 | Kilheffer et al. | 404/72 |
| 5,106,227 A | 4/1992 | Ahmad et al. | |
| 5,123,778 A | 6/1992 | Bohnhoff | |
| 5,149,192 A | 9/1992 | Hamm et al. | |
| 5,182,137 A | 1/1993 | Allen | |
| 5,225,210 A * | 7/1993 | Shimoda | 425/145 |
| 5,250,340 A | 10/1993 | Bohnhoff | |
| 5,298,539 A | 3/1994 | Singh et al. | |
| 5,364,672 A | 11/1994 | Schultze-Kraft | |
| 5,447,388 A * | 9/1995 | Rouse | 404/72 |
| 5,480,256 A * | 1/1996 | Itsekson et al. | 404/72 |
| 5,494,741 A * | 2/1996 | Fekete et al. | 428/331 |
| 5,590,976 A * | 1/1997 | Kilheffer et al. | 404/72 |
| 5,648,421 A | 7/1997 | Thiele et al. | |
| 5,693,413 A | 12/1997 | Hesterman et al. | |
| 5,788,407 A | 8/1998 | Hwang | |
| 5,836,715 A | 11/1998 | Hendrix et al. | |
| 5,848,856 A | 12/1998 | Bohnhoff | |
| 5,891,938 A | 4/1999 | Williams | |
| 5,936,015 A * | 8/1999 | Burns | 524/71 |
| 5,956,294 A | 9/1999 | Takizawa et al. | |
| 6,007,233 A * | 12/1999 | Cairns | 366/42 |
| 6,206,607 B1 | 3/2001 | Medico, Jr. et al. | |
| 6,225,371 B1 | 5/2001 | Prerre | |
| 6,235,367 B1 | 5/2001 | Holmes et al. | |
| 6,370,087 B1 | 4/2002 | Akahane et al. | |
| 6,372,135 B1 | 4/2002 | Kohlstadt et al. | |
| 6,495,652 B1 | 12/2002 | Reichelt et al. | |
| 6,702,514 B2 | 3/2004 | Kaneko et al. | |
| 6,826,122 B2 | 11/2004 | Zaugg | |
| 6,887,922 B1 | 5/2005 | Roddis | |
| 6,962,463 B2 | 11/2005 | Chen | |
| 7,041,221 B2 | 5/2006 | Arnott | |
| 7,168,884 B2 | 1/2007 | Hart | |
| 7,172,145 B2 * | 2/2007 | Knepp | 241/101.5 |
| 7,342,056 B2 | 3/2008 | Patel et al. | |
| 7,496,003 B2 | 2/2009 | Muller | |
| 7,782,717 B2 | 8/2010 | Gil et al. | |
| 7,879,921 B2 | 2/2011 | Cummins | |
| 8,025,456 B2 | 9/2011 | Kaul | |
| 2002/0016421 A1 | 2/2002 | Goeb et al. | |
| 2002/0022086 A1 | 2/2002 | Hughes et al. | |
| 2004/0091712 A1 | 5/2004 | Marohn | |
| 2004/0109730 A1 | 6/2004 | Moss et al. | |
| 2006/0293428 A1 | 12/2006 | Singh et al. | |
| 2007/0091727 A1 | 4/2007 | Bonvin et al. | |
| 2007/0093602 A1 | 4/2007 | Thompson-Colon et al. | |
| 2007/0172590 A1 | 7/2007 | Hoffmann et al. | |
| 2007/0189109 A1 | 8/2007 | Long | |
| 2007/0213456 A1 | 9/2007 | Singh et al. | |
| 2008/0058461 A1 | 3/2008 | Cummins | |
| 2008/0118637 A1 | 5/2008 | Serwin | |
| 2008/0144444 A1 | 6/2008 | Mahler et al. | |
| 2008/0151698 A1 | 6/2008 | Gil et al. | |
| 2008/0253235 A1 | 10/2008 | Hiraga et al. | |
| 2009/0062432 A1 | 3/2009 | Doesburg et al. | |
| 2009/0067924 A1 | 3/2009 | Kaul | |
| 2009/0067925 A1 | 3/2009 | Kaul | |
| 2009/0095820 A1 | 4/2009 | Roser et al. | |

FOREIGN PATENT DOCUMENTS

| | | | |
|---|---|---|---|
| CN | 1968982 A | | 5/2007 |
| CN | 1994955 A | | 7/2007 |
| CN | 101357828 A | | 2/2009 |
| DE | 651167 C | | 10/1937 |
| DE | 20000015 U1 | | 5/2000 |
| DE | 10231858 A1 | | 1/2004 |
| EP | 0445578 A2 | | 9/1991 |
| EP | 0583086 A1 | | 2/1994 |
| EP | 0911304 A1 | | 4/1999 |
| EP | 1176257 A2 | | 1/2002 |
| EP | 1462571 A2 | | 9/2004 |
| FR | 2188596 A5 | | 1/1974 |
| FR | 2653360 A1 | | 4/1991 |
| FR | 2791692 A1 | | 10/2000 |
| GB | 1604405 | | 12/1981 |
| JP | H 04-001309 A | | 1/1992 |
| JP | H 10-102444 A | | 4/1998 |
| JP | H 11-80304 A | | 3/1999 |
| JP | 2002-021011 A | | 1/2002 |
| JP | 2003-267953 A | | 9/2003 |
| JP | 2004-076527 A | | 3/2004 |
| JP | 2007-132020 A | | 5/2007 |
| JP | 2007-285045 A | | 11/2007 |
| JP | 2008-502773 A | | 1/2008 |
| JP | 2009-293326 A | | 12/2009 |
| WO | WO 9500569 A1 | | 1/1995 |
| WO | WO 9829356 A2 | | 7/1998 |
| WO | WO 02/076900 A2 | | 10/2002 |
| WO | WO 03/062532 A1 | | 7/2003 |
| WO | WO 2004/014815 A1 | | 2/2004 |
| WO | WO 2009/033037 A1 | | 3/2009 |
| WO | WO 2010149737 A2 | | 12/2010 |
| WO | WO 2011/084274 A1 | | 7/2011 |
| WO | WO 2011/084793 A1 | | 7/2011 |
| WO | WO 2011/084802 A1 | | 7/2011 |
| WO | WO 2011/084807 A1 | | 7/2011 |
| WO | WO 2012091707 A1 | | 7/2012 |

OTHER PUBLICATIONS

English language translation for FR 2188596 extracted from the espacenet.com database on Aug. 23, 2012, 11 pages.
English language abstract for WO 02/076900 extracted from the espacenet.com database on Aug. 23, 2012, 16 pages.
International Search Report for Application No. PCT/US2010/058582 dated Apr. 27, 2011, 4 pages.
Database Chemical Abstracts, Chemi [Online], Oct. 7, 1991, Yamaguchi H. et al., "Manufacture of colored artificial stones with high strength", 2 pages.
English language machine-assisted translation for DE 651167 extracted from the espacenet.com database on Jun. 4, 2012, 9 pages.

(56) References Cited

OTHER PUBLICATIONS

English language partial machine-assisted translation for DE 20000015 extracted from the espacenet.com database on Jun. 4, 2012, 24 pages.
English language abstract for EP 0445578 extracted from the espacenet.com database on Jun. 4, 2012, 8 pages.
English language abstract and machine-assisted translation for EP 1176257 extracted from the espacenet.com database on Jun. 4, 2012, 25 pages.
English language abstract and machine-assisted translation for EP 1462571 extracted from the espacenet.com database on Jun. 4, 2012, 9 pages.
English language abstract and machine-assisted translation for FR 2653360 extracted from the espacenet.com database on Jun. 4, 2012, 17 pages.
English language abstract and machine-assisted translation for FR 2791692 extracted from the espacenet.com database on Jun. 4, 2012, 9 pages.
English language abstract and machine-assisted translation for JP 2004-076527 extracted from the PAJ database on Jun. 4, 2012, 30 pages.
English language abstract and machine-assisted translation for WO 9500569 extracted from the espacenet.com database on Jun. 4, 2012, 37 pages.
English language abstract and machine-assisted translation for WO 9829356 extracted from the espacenet.com database on Jun. 4, 2012, 28 pages.
International Search Report for Application No. PCT/US10/61558 dated Mar. 3, 2011, 2 pages.
International Search Report for Application No. PCT/US10/61574 dated Mar. 4, 2011, 2 pages.
International Search Report for Application No. PCT/US10/61587 dated Mar. 1, 2011, 2 pages.
International Search Report for Application No. PCT/EP10158989 dated Aug. 19, 2011, 4 pages.
Montes, F., Valavala, S., and Haselbach, L. "A New Test Method for Porosity Measurements of Portland Cement Pervious Concrete," J. ASTM Int. 2(1), 2005.
Crouch, L. K., Cates, M., Dotson, V. James, Jr., Honeycutt, Keith B., and Badoe, D. A. "Measuring the Effective Air Void Content of Portland Cement Pervious Pavements," ASTM Journal of Cement, Concrete, and Aggregates, 25(1), 2003.
Montes, F., Haselbach, L. "Measuring Hydraulic Conductivity in Pervious Concrete," Env. Eng. Sci. 23(6), 2006.
Schaefer, V., Wang, K., Suleimman, M., and Kevern, J. "Mix Design Development for Pervious Concrete in Cold Weather Climates," Final Report, Civil Engineering, Iowa State University, 2006.

English language abstract for CN 1609340 extracted from espacenet.com database on Dec. 29, 2014, 2 pages.
English language abstract and machine-assisted English translation for CN 1994955 extracted from espacenet.com database on Jan. 22, 2015, 20 pages.
English language abstract and machine-assisted English translation for DE 10231858 extracted from espacenet.com database on Mar. 18, 2014, 12 pages.
English language abstract and machine-assisted English translation for JP 2003-267953 extracted from the PAJ database on Jan. 19, 2015, 27 pages.
English language abstract and machine-assisted English translation for JP 2007-132020 extracted from the PAJ database on Jan. 19, 2015, 21 pages.
English language abstract and machine-assisted English translation for JP 2007-285045 extracted from the PAJ database on Jan. 19, 2015, 13 pages.
English language abstract for JP 2008-502773 extracted from the PAJ database on Jan. 19, 2015, 1 page.
International Search Report for Application No. PCT/US2010/062433 mailed Oct. 6, 2011.
People's Republic of China Search Report for Application No. 201080063254.8 mailed Mar. 8, 2014.
English language abstract for CN 1968982 extracted from espacenet.com database on Dec. 2, 2015, 1 page (see also English language equivalent U.S. Pat. No. 7,342,056 previously submitted on Feb. 2, 2015).
English language abstract and machine-assisted English translation for JPH 04-001309 extracted from the PAJ database on Apr. 21, 2016, 6 pages.
English language abstract and machine-assisted English translation for JPH 10-102444 extracted from espacenet.com database on Apr. 21, 2016, 17 pages.
English language abstract and machine-assisted English translation for JPH 11-80304 extracted from espacenet.com Database on Apr. 21, 2016, 13 pages.
English language abstract and machine-assisted English translation for JP 2002-021011 extracted from the PAJ Database on Apr. 21, 2016, 17 pages.
English language abstract and machine-assisted English translation for WO 2004/014815 extracted from espacenet.com database on Apr. 21, 2016, 20 pages.
English language abstract for CN 101357828 extracted from espacenet.corn database on Aug. 19, 2015, 1 page.
English language abstract and machine-assisted English translation for JP 2009-293326 extracted from espacenet.com database on Aug. 27, 2015, 44 pages.

* cited by examiner

METHOD OF PRODUCING A COMPOSITE MATERIAL USING A MIXING SYSTEM

FIELD OF THE INVENTION

The present invention generally relates to a method of producing a composite material using a mixing system, specifically to a method of producing a composite material comprising at least one aggregate and the reaction product of a two-component polymeric binder composition.

BACKGROUND OF THE INVENTION

The use of composite materials to form a paved structure, such as concrete pavement is known in the construction art. Generally, the composite material is produced by mixing at least one aggregate and at least one binder component together. For example, in the case of concrete, the aggregate comprises sand and gravel, and the binder composition comprises cement and water.

Recently, there have been advancements in the use of polymeric materials as the binder composition. Generally, once the aggregate and the binder composition are mixed together, the composite material remains pliable for only a short time, e.g. 45 minutes, before the composite material cures and is no longer pliable. Therefore, such composite materials are typically produced onsite as opposed to offsite. Offsite production requires the composite material to be transported to a construction site thereby decreasing a working time of the composite material once onsite.

Conventional methods of producing the composite material onsite require the aggregate to be placed on the ground before coming into contact with the binder composition. Subsequently, the aggregate is sprayed with the binder composition comprising the polymeric material. A significant drawback of such methods is inconsistent and non-uniform coating of the aggregate, which creates inconsistencies in the composite material. Inconsistencies in the composite material can result in early failure of the composite material thereby requiring the composite material to be replaced at additional cost.

Alternatively, the aggregate and binder composition can be tumbled in a batch mixer for several minutes until the aggregate is uniformly coated with the binder composition before it is set into place. A significant drawback of this process, commonly referred to as a batch process is reduced working time since the binder composition is already starting to react/cure while its in the batch mixer being tumbled with the aggregate. Also, producing a composite by the batch process limits the efficiency of installing the composite material to form the paved structure.

Accordingly, there remains an opportunity to develop a mixing system that can be employed at a construction site (i.e., employed onsite) on demand that is capable of utilizing recent advancements in polymeric materials as the binder composition thereby providing improved composite materials.

SUMMARY OF THE INVENTION AND ADVANTAGES

A method of producing a composite material using a mixing system is disclosed. The composite material comprises at least one aggregate and a reaction product of a two-component polymeric binder composition comprising a first component and a second component. The mixing system includes an aggregate vessel for holding the aggregate. The mixing system also includes a first vessel for holding the first component and a second vessel for holding the second bonder component independent from the first component. The mixing system further comprises a mixing apparatus in communication with the aggregate vessel and the first and the second vessels for mixing the aggregate, the first component, and the second component to produce the composite material.

The method comprises the steps of providing the aggregate into the mixing apparatus at a delivery rate and providing the first component and the second component into the mixing apparatus. The method also comprises the steps of mixing the first the second components with the mixing apparatus to produce the reaction product of the two-component polymeric binder composition. The method further comprises the step of applying the reaction product of the two-component polymeric binder composition to the aggregate within the mixing apparatus at an application rate to produce the composite material.

Generally, applying the reaction product of the two-component polymeric binder composition to the aggregate within the mixing apparatus results in the aggregate being uniformly and consistently coated with the reaction product of the two-component polymeric binder composition. Uniform and consistent coating of the aggregate with the reaction product of the two-component polymeric binder composition imparts the composite material with excellent physical properties, such as increased compressive strength, increased flexural strength, and increased tensile strengths.

BRIEF DESCRIPTION OF THE DRAWINGS

Other advantages of the present invention will be readily appreciated, as the same becomes better understood by reference to the following detailed description, when considered in connection with the accompanying drawings wherein.

DETAILED DESCRIPTION OF THE INVENTION

Figure 1:
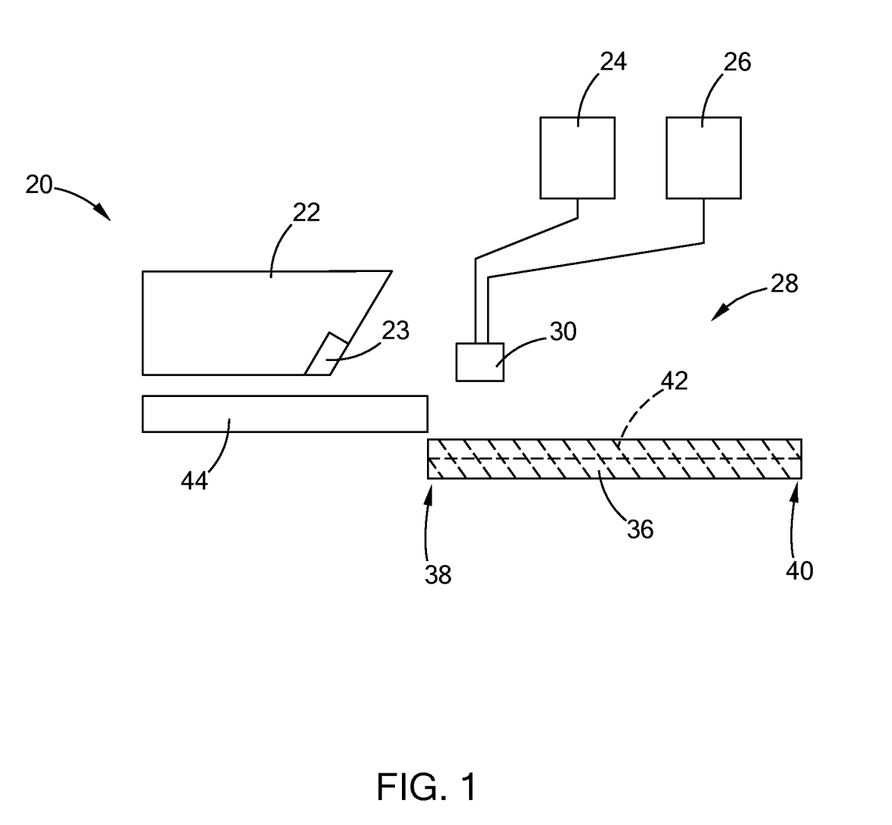
FIG. 1 is a schematic view of an embodiment of a mixing system.
Figure 2:
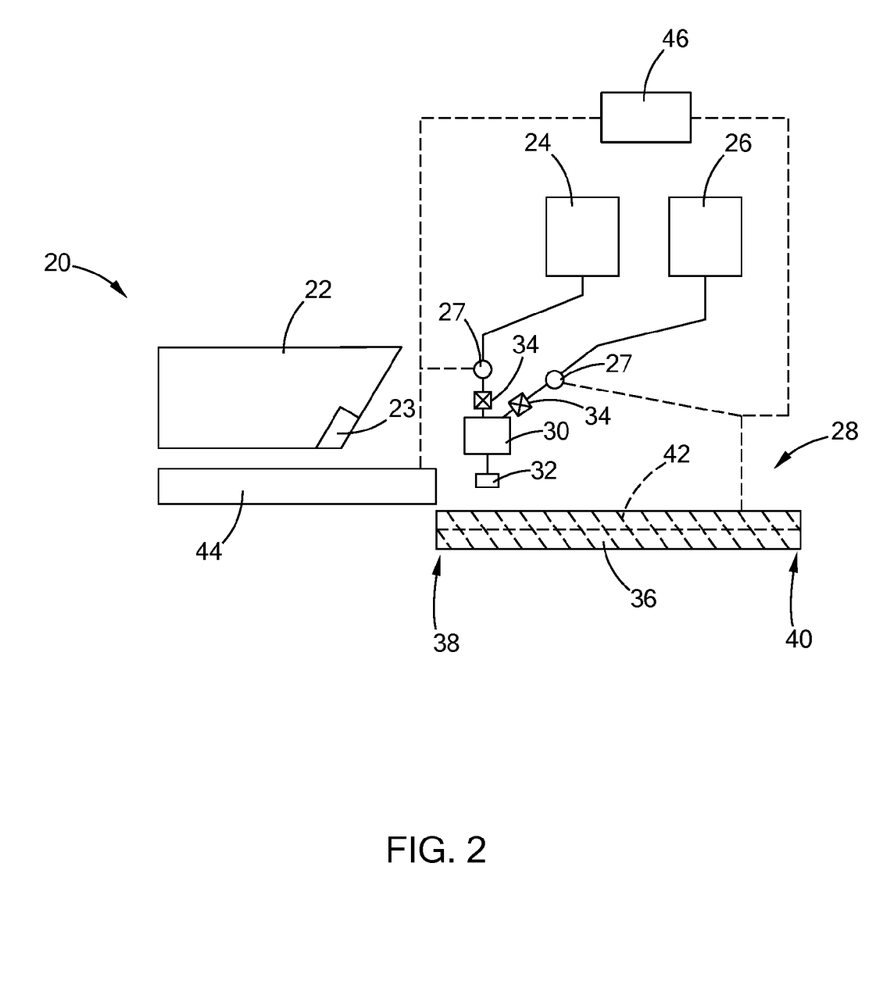
FIG. 2 is a schematic view of another embodiment of the mixing system.

Referring to the Figures, wherein like numerals indicate like or corresponding parts throughout the several views, a mixing system for producing a composite material is shown at 20. The mixing system 20 is described in further detail below. The composite material comprises at least one aggregate and a reaction product of a two-component polymeric binder composition. Generally, the composite material is suitable for forming a paved structure, such as roads, sidewalks and patios. It is to be appreciated that the composite material is not limited to any particular use. For example, the composite material may also be used for hydraulic revetments, and any other types of barriers, such as to prevent erosion, and reduce sound transmission.

The composite material has a compressive strength and a tensile strength. Generally, both the aggregate and the reaction product of the two-component polymeric binder composition impart compressive strength to the composite material. The reaction product of the two-component polymeric binder composition also provides adhesion between the aggregate and generally imparts tensile strength, and flexural strength to the composite material. The two-component polymeric binder composition is hereinafter referred to as the binder composition.

As used herein, the term aggregate is to be interpreted as referring to aggregate or aggregates in general and not to a single aggregate, nor is it to be construed to require more than one aggregate. Additionally, the term aggregate, as used herein, is intended to encompass a broad category of materials that serves as reinforcement to the composite material, such as rock, glass, rubber crumb, etc. The term rock as used herein is intended to encompass all forms of rock, including, but not limited to, gravel, sand, etc. Additionally, the term rock as used herein is intended to encompass all species of rock, such as granite, limestone, marble, etc.

In one embodiment, the aggregate comprises rock. The rock is typically selected from the group of granite, limestone, marble, beach stone/river rock, pea gravel, iron slag, copper slag, sand and combinations thereof. However, it is to be appreciated that any type of rock can be used. The average diameter of the aggregate is typically of from about 0.001 to about 7, more typically of from about 0.1 to about 5, and most typically of from about 0.125 to about 3, inches.

In other embodiments, the aggregate comprises rubber crumb. It is to be appreciated that any type of rubber crumb can be used. The rubber crumb is typically present in an amount of from about 1 to about 100, and more typically of from about 5 to about 100, and most typically of from about 10 to 100% by weight, based on 100 parts by weight of the aggregate present in the composite material. The average diameter of the aggregate is typically of from about 0.1 to about 3, more typically of from about 0.1 to about 2, and most typically of from about 0.1 to about 0.25, inches. Suitable grades of rubber crumb, for purposes of the present invention, are commercially available from Entech Inc., Crumb Rubber of White Pigeon, Mich.

In certain embodiments, the aggregate comprises glass and rock. Suitable rock, for the purposes of the present invention, includes those described above. The glass is typically present in an amount of from about 1 to about 100, more typically from about 25 to about 100, and most typically from about 75 to about 100% by weight, based on 100 parts by weight of the aggregate present in the composite material. The rock is typically present in an amount of from about 1 to about 100, more typically from about 10 to about 100, and most typically from about 10 to 25% by weight, based on 100 parts by weight of the aggregate present in the composite material. The average diameter of the aggregate is typically of from about 0.001 to about 1.0, more typically from about 0.1 to about 0.5, and most typically from about 0.1 to about 0.3, inches.

Although not required, the glass may be post-consumer and/or recycled glass. When employed, the glass is typically crushed to meet the average diameter ranges as described above. For safety, the glass is typically tumbled for rounding sharp edges of the glass. Examples of suitable glass, for purposes of the present invention, are commercially available from Glass Plus, Inc. of Tomahawk, Wis. It is to be appreciated that any type of glass may be used for purposes of the present invention.

The binder composition comprises a first component and a second component. As such, it is to be appreciated that the term two-component refers to these components. Other additional components may be used. The binder composition may be referred to in the art as a 2K system. The first and second components are mixed to form the reaction product of the binder composition. The term reaction product as used herein is intended to encompass all stages of interaction and/or reaction between the first and second components, including reaction products of the first and second components, even when the reaction product contacts the aggregate to form the composite material. Generally, the reaction product begins to form when the first and second components come into contact with each other.

As introduced above, the binder composition comprises the first and second components, and optionally, one or more additional components, e.g. an additive component. The binder composition can be a thermoset or thermosetting adhesive composition, such as a two-component or 2K adhesive. In other embodiments, the binder composition is a thermoplastic adhesive composition. In certain embodiments, the reaction product is an elastomer.

Generally, when the first and second components are brought into contact with each other, such as by mixing the first and second components together, the first and second components begin to react to form the reaction product. The reaction product, during formation, adheres the aggregate together. It is to be appreciated that the reaction product can begin to form over a period of time prior to introducing the aggregate. Typically, the aggregate is introduced before the reaction product reaches a final reaction (or final cure) state. It is also to be appreciated that the reaction between the first and second components may be delayed for some period of time after the first and second components are brought into contact with each other.

The reaction between the first and second components is commonly referred to in the art as a crosslink or crosslinking reaction, which generally results in build-up of molecular chains, i.e., molecular weight, in the reaction product to produce a crosslinked structure. Reaction of the first and second components can occur at various temperatures, such as room or ambient temperature, although heating may be applied to one or more of the components to trigger and/or accelerate reaction between the first and second components. In certain embodiments, although dependent in part on the specific components employed, application of heat accelerates reaction between the first and second components, and may impart stronger bonds and therefore increased cohesive strength within the reaction product.

Generally, for purposes of the present invention, any type of adhesive system, more typically any type of thermosetting adhesive system can be used as the binder composition. As such, the reaction product can be any type of adhesive, more typically any type of thermosetting adhesive. Examples of suitable adhesive systems include, but are not limited to, adhesive systems that comprise: alcohols, such as diols and polyols; amines, such as diamines and polyamines; phenolic resins and/or phenolic-based components, such as phenoxy resins, phenolic formaldehyde (PF) resins, phenolic neoprene, and resorcinol formaldehydes (RF); polyester-based components, such as styrene polyesters and/or vinyl polyesters; imide-based components, such as polyimides; epoxy resins and/or epoxy-based components, such as epoxidized diols and polyols; and combinations thereof. As used herein, the terminology adhesive systems generally includes instances where the first and second components are still separate from each other, as well as instances when the first and second components are in contact with each other but generally prior to reaction. As such, the terminology adhesive generally includes instances when the reaction product is forming or has completely formed.

Specific examples of suitable adhesives, i.e., reaction products, for purposes of the present invention, include polyurethanes, polyureas, polyurethane/ureas, epoxies, phenolic adhesives, polyesters, and combinations thereof. Further examples of suitable adhesive compositions and adhesives, for purposes of the present invention, are generally described as "adhesive binders" in U.S. Patent Publication Nos. 2009/0067924 and 2009/0067295, both to Kaul, the disclosures of which, as well as the disclosures of patents and publications referenced therein, are incorporated herein by reference in their entirety. Specific embodiments of the two-component polymeric binder compositions and reaction products thereof are described below.

In one embodiment, the reaction product is a polyurethane. In this embodiment, the first component is an isocyanate component and the second component is an isocyanate-reactive component.

If employed, the isocyanate component is typically a polyisocyanate having two or more isocyanate functional (NCO) groups. The isocyanate component typically has an average functionality of from about 1.5 to about 3, more typically from about 2 to about 2.8.

Suitable polyisocyanates, for purposes of the present invention include, but are not limited to, conventional aliphatic, cycloaliphatic, araliphatic and aromatic isocyanates. In certain embodiments, the isocyanate component is selected from the group of diphenylmethane diisocyanates (MDIs), polymeric diphenylmethane diisocyanates (PMDIs), and combinations thereof. Polymeric diphenylmethane diisocyanates are also referred to in the art as polymethylene polyphenylene polyisocyanates. Examples of other suitable isocyanates, for purposes of the present invention include, but are not limited to, toluene diisocyanates (TDIs), hexamethylene diisocyanates (HDIs), isophorone diisocyanates (IPDIs), naphthalene diisocyanates (NDIs), and combinations thereof.

In certain embodiments, the isocyanate component is an isocyanate-terminated pre-polymer. The isocyanate-terminated prepolymer is a reaction product of an isocyanate and a polyol and/or a polyamine, as understood in the polyurethane art. The isocyanate may be any type of isocyanate known to those skilled in the polyurethane art, such as one of the polyisocyanates described above. If employed to make the isocyanate-terminated prepolymer, the polyol is typically selected from the group of ethylene glycol, diethylene glycol, propylene glycol, dipropylene glycol, butane diol, glycerol, trimethylolpropane, triethanolamine, pentaerythritol, sorbitol, and combinations thereof. If employed to make the isocyanate-terminated prepolymer, the polyamine is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof. It is to be appreciated that the isocyanate-terminated prepolymer may be formed from a combination of two or more of the aforementioned polyols and/or polyamines. The isocyanate component may also be a modified isocyanate, such as, carbodiimides, allophanates, isocyanurates, and biurets. In one embodiment of the present invention, the isocyanate component comprises a blend of polymeric methyldiphenyldiisocyanate and quasi-prepolymers of 4,4'-methyldiphenyldiisocyanate.

Specific examples of suitable isocyanate components, for purposes of the present invention, are commercially available from BASF Corporation of Florham Park, N.J., under the trademark LUPRANATE®. It is to be appreciated that the first component can include any combination of two or more of the aforementioned isocyanates.

If employed, the isocyanate-reactive component is typically selected from the group of alcohols, amines, crosslinkers, chain extenders, and combinations thereof. Suitable alcohols include diols, i.e., alcohols having two hydroxyl functional groups, and polyols, i.e., alcohols having three or more hydroxyl functional groups. Suitable amines include diamines, i.e., amines having two amine functional groups, and polyamines, i.e., amines having three of more amine functional groups. In certain embodiments, the isocyanate-reactive component comprises at least one of an aliphatic amine, an aliphatic alcohol, an aromatic amine, and an aromatic alcohol.

If employed, the alcohol (or alcohols) can comprise a polyester polyol, a polyether polyol, and combinations thereof. Other suitable alcohols include, but are not limited to, ethylene glycol, diethylene glycol, propylene glycol, dipropylene glycol, butane diol, glycerol, trimethylolpropane, amine-initiated polyols such as triethanolamine, pentaerythritol, sorbitol, biopolyols such as soybean oil, castor-oil, soy-protein, rapeseed oil, etc., and combinations thereof.

If employed, the amine (or amines) can be selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

Suitable grades of alcohols, e.g. polyols, and amines, e.g. polyamines, for the purposes of the present invention, are commercially available from BASF Corporation. It is to be appreciated that other types of amines, e.g. diamines and polyamines, known in the art can also be used for purposes of the present invention. It is also to be appreciated that other types of alcohols, e.g. diols and polyols, known in the art can also be used for purposes of the present invention.

If employed, the isocyanate-reactive component is typically used in the binder composition in an amount of from about 10 to about 200, and more typically from about 30 to about 120, parts by weight, based on 100 parts by pre-reaction weight of all components in the binder composition except the isocyanate component.

When the reaction product is formed from the isocyanate and isocyanate-reactive components, the isocyanate index of the reaction product of the binder composition is typically about 70 to about 200, and more typically at least about 90 to 165.

In another embodiment, the reaction product is an epoxy. In this embodiment, the first component is an epoxy resin and the second component is a hardener. Examples of suitable epoxy resins, for purposes of the present invention, include resins having one or more epoxy groups, such as epoxy resins formed from a reaction between epichlorohydrin and bisphenol-A. Other suitable epoxies include those described and/or incorporated by reference in the Kaul publications, introduced above. Typically, the hardener comprises a polyamine, and more typically polyamine monomers. Various types of polyamines, including diamines and higher amines, can be employed, such as primary and secondary amines, with primary amines typically being employed. An example of a suitable hardener, for purposes of the present invention, is triethylenetetramine (TETA). In this embodiment, the first and second components can be employed in various amounts to form reaction product of the binder composition.

In another embodiment, the reaction product is a phenolic adhesive. In this embodiment, the first component typically includes a resin having one or more phenol groups. The resin is typically selected from the group of phenoxy resins, phenolic formaldehyde (PF) resins, phenolic neoprene, resorcinol formaldehydes (RF), and combinations thereof.

The second component typically comprises a catalyst. Suitable catalysts include, but are not limited to, peroxides, such as benzoyl peroxide. Other suitable phenolic adhesives include those described in and/or incorporated by reference in the Kaul publications, introduced above. It is to be appreciated that the first component can include additional functional groups in addition to the phenol group(s), such as hydroxyl (OH) groups.

In the aforementioned embodiment, the first and second components can be employed in various amounts to form the reaction product of the binder composition. The first component, e.g. the resin, is generally used in an excess relative to the second component, e.g. the catalyst. Typically, the first component is used in an amount of from about 50 to 99 parts by weight, more typically from about 90 to 99 parts by weight, each based on 100 parts by weight of the binder composition, to form the reaction product with the remaining parts by weight being the second component.

In another embodiment, the reaction product is an acrylic or acrylate adhesive. In this embodiment, the first component typically comprises acrylic and/or methylacrylic acid and the second component typically comprises a catalyst, such as a peroxide. In these embodiments, additional components can be used, such as chlorosulphonated polyethylene, which serve as a toughening agent for the reaction product.

In the aforementioned embodiment, the first component, e.g. the acid, is generally used in an excess relative to the second component, e.g. the catalyst. Typically, the first component is used in an amount of from about 50 to 99 parts by weight, more typically from about 90 to 99 parts by weight, each based on 100 parts by weight of the binder composition, to form the reaction product with the remaining parts by weight being the second component.

Depending on the specific components and amounts thereof employed, the aforementioned adhesive compositions can react (or cure) thereby forming the adhesives through a variety of mechanisms, such as addition polymerization, condensation polymerization, and/or free radical polymerization. Such mechanisms, as well as others, are generally understood by those skilled in the polymeric art.

Although not required, but as introduced above, the composite material may further comprise the additive component. Examples of additives include, but are not limited to, colorants, fibers, catalysts, fillers, etc. If employed, fibers are typically present in the composite material in an amount suitable to impart tensile strength to the composite material.

If employed, the colorant can be selected from the group of pigments, dyes, and combinations thereof. The colorant can be in either liquid or powder form. If employed, the colorant is typically a pigment or a pigment blend of two or more pigments. The pigment, or pigment blend, is used to impart a desired color to the composite material. Different types of pigments can be used for purposes of the present invention. For example, titanium dioxide can be used to impart a white color and carbon black can be used to impart a black color, to the composite material, respectively, while various blends of titanium dioxide and carbon black can be used to impart various shades of gray to the composite material. Examples of suitable grades of carbon black and titanium dioxide for purposes of the present invention are commercially available from Columbian Chemicals Company of Marietta, Ga., and DuPont® Titanium Technologies of Wilmington, Del., respectively. Other pigments including, but not limited to, red, green, blue, yellow, green, and brown, and pigment blends thereof, can also be used to impart color to the composite material in addition to or alternative to carbon black and/or titanium dioxide. Examples of suitable grades of pigments for purposes of the present invention are commercially available from various companies such as BASF Corporation and Penn Color, Inc. of Hatfield, Pa. It is to be appreciated that various blends of the aforementioned colorants, e.g. pigments, can be used to impart the composite material with various colors, strengths, and shades.

If employed in the composite material, the colorant is typically present in the composite material in an amount suitable to impart the composite material with a desired color, strength and shade, while not materially affecting physical properties of the composite material. In certain embodiments employing the colorant, the colorant is typically present in the binder composition in an amount of from about 0.1 to about 10, and more typically of from about 0.1 to about 5, parts by weight, based on 100 parts by weight of the binder composition.

Referring now to FIG. 1, the mixing system 20 includes at least one aggregate vessel 22 for holding the aggregate. It is to be appreciated that when two or more aggregates are used, such as glass and rock, the aggregates may be pre-mixed prior to disposing the aggregates within the aggregate vessel 22. Alternatively, the aggregate vessel 22 may include at least one dividing wall for holding the aggregates independent from each other within the same aggregate vessel 22. Alternatively, when two or more aggregates are employed independent from each other, the mixing system 20 can include one aggregate vessel 22 for each of the aggregates, respectively. For example, the mixing system 20 can include a first aggregate vessel for glass and a second aggregate vessel for rock.

It is to be appreciated that any type of vessel 22 suitable for holding the aggregate can be employed in the present invention. Typically, the aggregate vessel 22 defines a hole 23. The aggregate vessel 22 also includes a gate, the gate typically being adjacent to the hole 23. The gate is operable between an open and closed position, such that when the gate is in the closed position, the aggregate is retained within the aggregate vessel 22, and when the gate is in the open position, the aggregate exits the aggregate vessel 22 through the hole 23. It is to be appreciated that the aggregate may exit the aggregate vessel 22 by other methods known in the art without departing from the scope of the present invention. If the additive component is employed, the mixing system 20 can include an additive vessel for holding the additive component. Alternatively, the additive component may be disposed into at least one of the aggregate vessels 22.

The mixing system 20 further includes a first vessel 24 for holding the first component and a second vessel 26 for holding the second component independent from the first component. Said differently, the first component and the second component of the binder composition are provided to the mixing system 20 independent of each other, i.e. prior to mixing. It is to be appreciated that the first and second components may be dispensed from the vessels 24, 26 by any suitable method.

In one embodiment, the vessels 24, 26 each include a pump 27 in fluid communication with the first and second vessels 24, 26, respectively for dispensing the first and second components from the first and second vessels 24, 26. The pumps 27 dispense the first and second components in an appropriate ratio as required to form the reaction product of the two-component polymeric binder composition. If the pumps 27 are employed, the mixing system also includes a pump motor for rotating the pumps 27 to control the dispensing of the first and second components from the first and second vessels 24, 26.

The mixing system 20 further includes a mixing apparatus 28 in communication with the aggregate vessel 22, and the first and second vessels 24, 26 for mixing the aggregate, the first component and the second component to produce the composite material. The mixing apparatus 28 includes a mixer 30, also referred to in the art as a mix head, in fluid communication with the first and second vessels 24, 26. The mixer 30 intimately mixes the first and second components to produce the reaction product of the binder composition. It is to be appreciated that the mixer 30 can be of any type suitable for mixing the first and second components, such as mechanical mixers and non-mechanical mixers. For example, in one embodiment, the mixer 30 is a static mixer for mixing the first and second components to form the reaction product of the binder composition.

Although not required, the mixing apparatus 28 may further includes an applicator 32 in fluid communication with the mixer 30, as shown in FIG. 2. The applicator 32 applies the reaction product of the binder composition as described in detail below. It is to be appreciated that the mixer 30 may also be the applicator 32. For example, the mixer 30 may be an impingement mixer, which directs separate streams of the first and second components component together for mixing the first and second components to form the reaction product of the binder composition while simultaneously applying the reaction product of the binder composition. When the additive vessel is employed, and the additive component is liquid, the additive vessel is in communication with the mixer 30 for allowing the additive component to be mixed with the first and second components. Alternatively, the additive component can be disposed within one of the vessels 24, 26.

Generally, the aggregate is provided to the mixing apparatus 28 at a delivery rate and the reaction product of the binder composition is applied to the aggregate within the mixing apparatus 28 at an application rate to produce the composite material. It is to be appreciated that the composite material is produced once the reaction product of the binder composition contacts the aggregate. The reaction product can be formed before, after, or contemporaneously with contacting the aggregate. The delivery rate is dependent, in part, on an amount of the composite material the mixing system 20 is to produce.

The application rate of the reaction product to the aggregate is generally dependent on the delivery rate of the aggregate to the mixing apparatus 28. If the pumps 27 are employed, the pumps varying the application rate of the reaction product of the binder composition dependent, in part, on the delivery rate of the aggregate.

The application rate of the reaction product to the aggregate is typically of from about 1 to about 7, and more typically from about 1.8 to about 5, gallons per cubic feet of the aggregate provided into the channel.

Although not required, the mixing apparatus 28 typically includes a valve 34 in fluid communication with the mixer 30, as shown in FIG. 2. It is to be appreciated that the valve 34 can be located downstream of the mixer 30 such that the first and second components are mixed by the mixer 30 prior to passing through the valve 34. Alternatively, the mixing apparatus 28 may include a second valve 34 with the valves 34 disposed upstream of the mixer 30 such that the first and second components each individually pass through one of the valves 34, respectively, before entering the mixer 30. The valve 34 is operable between an open position and closed position for preventing the introduction of air into the mixer 30 when the mixing system 20 is idle.

The mixing apparatus 28 typically includes a housing 36 defining a channel in communication with the mixer 30 and the aggregate vessel 22. The channel is in fluid communication with the mixer 30 for receiving the reaction product of the binder composition. Additionally, the channel is in communication with the aggregate vessel 22 for receiving the aggregate. The channel has a first end 38 and a second end 40 spaced from each other with the channel generally defining a U-shaped cross-section therebetween. The first end 38 of the channel receives the aggregate and the reaction product of the binder composition. As such, the reaction product of the binder composition is applied to the aggregate within the channel. It is to be appreciated that the aggregate may be stationary within the channel or, alternatively, the aggregate may be moving within the channel as the reaction product of the binder composition is applied to the aggregate. The aggregate is transported from the aggregate vessel 22 to the channel at the delivery rate and the reaction product of the binder composition is applied to the aggregate within the channel at the application rate.

In one embodiment, the mixing apparatus 28 further includes an auger 42, also referred to in the art as an auger mixer. The auger 42 is rotatably disposed within the channel for mixing the composite material and dispensing the composite material from the channel. The auger 42 includes a shaft with flighting in a spiral configuration such that the rotation of the auger 42 results in the composite material moving from the first end 38 of the channel to the second end 40 of the channel. The shaft can also include one or more pins or fingers for additional mixing. As the composite material is moved within the channel, the auger 42 mixes the composite material to increase the surface area of the aggregate exposed to the reaction product of the binder composition thereby coating the aggregate with the reaction product of the binder composition.

The mixing of the composite material by the auger 42 ensures that the composite material produced by the mixing system 20 is uniform and consistent.

As the composite material reaches the second end 40 of the channel, the composite material is dispensed from the channel. Typically, when the additive vessel is employed and the additive component comprises a powder and/or fibers, the additive vessel is in communication with the channel for allowing the additive to be mixed with the reaction product of the binder composition and the aggregate. As described above, it is to be appreciated that the additive component can also be added to one of the vessels 22, 24, 26 and/or somewhere between the vessels 22, 24, 26 and the mixing apparatus 28.

The composite material is pliable as it is dispensed from the channel for allowing the composite material to be shaped into a desired configuration, i.e. the composite material has sufficient working time after dispensing. The mixing system 20 is capable of producing and dispensing the composite material in of from about 5 to about 15 seconds. This relatively short production time ensures that the composite material will be pliable for some time after it is dispensed from the channel, typically at least about 10 minutes.

The composite material starts to cure once the composite material is produced, i.e., once the reaction product of the binder composition contacts the aggregate whereas the reaction product typically starts to cure once the first and second components come into contact with each other. After the composite material starts to cure, the composite material only remains pliable for a limited time until the composite material fully cures, i.e. the reaction product reaches a final cure state such that the composite material is no longer pliable or workable. Once the composite material fully cures, the paved structure is formed. It is to be appreciated that a step of curing the composite material refers to the process of fully curing the composite material. It is also to be appreciated that curing the composite material may be passive, i.e., there is no need for an affirmative step, such as heating, etc. to fully cure the composite material and curing may naturally occur via the respective curing mechanism of the first and second components.

In one embodiment, the mixing system 20 further includes a conveyer 44 disposed between the aggregate vessel 22 and the mixing apparatus 28 for transporting the aggregate from the aggregate vessel 22 to the channel at the delivery rate. It is to be appreciated that the delivery rate is controlled by a size of the hole 23 in the aggregate vessel 22 and a speed of the conveyer 44. It is also to be appreciated that the conveyer 44 can be of any type suitable for transporting the aggregate. For example, the conveyer 44 may be a belt that includes a first portion and a second portion with an endless belt disposed therebetween. The conveyer 44 is typically disposed below the aggregate vessel 22 such that the particulate component is allowed to move from the aggregate vessel 22 onto the conveyer 44. The conveyer 44 then transports the aggregate into the channel at the delivery rate.

Referring to FIG. 2, in one embodiment, the mixing system 20 further includes a controller 46 in communication with the conveyer 44, the auger 42 and the pumps 27. The controller 46 communicates with the conveyer 44 for receiving the delivery rate of the aggregate. Based on the received delivery rate, the controller 46 determines the required application rate. The controller 46 may also control the speed of the conveyer 44 for controlling the delivery rate of the aggregate to the channel. The controller 46 also communicates with the pumps 27 to control the application rate of the reaction product of the binder composition to the aggregate within the channel dependent on the delivery rate of the aggregate into the channel. The controller 46 communicates with the auger 42 for controlling a rate of rotation of the auger 42. It is to be appreciated that the conveyer 44, auger 42 and the pumps 27 may be controlled manually.

The mixing system 20 may include a power source, such as an engine, a motor, etc., mechanically coupled to the conveyer 44 and the auger 42 for providing power to the conveyer 44 and the auger 42. The power source may also be coupled to the controller 46 for powering the controller 46.

The system may further include a platform. At least one of the aggregate vessel 22, the first vessel 24, the second vessel 26 and the mixing apparatus 28 are typically disposed on the platform. Although not required, the mixing system 20 may include the platform for transporting the mixing system 20 thereby making the mixing system 20 portable between job sites. It is to be appreciated that the mixing system 20 may also be transported to the job site and assembled on the ground or supported by another structure such that the mixing system 20 is generally non-portable. In one embodiment employing the platform, the aggregate vessel 22, the first vessel 24, the second vessel 26 and the mixing apparatus 28 are disposed on the platform. The platform is portable and can be of various forms, such as a trailer, a flat bed of a truck, etc.

Typical methods of using the mixing system 20 will now be described. In one embodiment, the method of using the mixing system 20 comprises the steps of providing the aggregate into the mixing apparatus 28 at the delivery rate and providing the first and second components into the mixing apparatus 28. The method also comprises the step of mixing the first and second components with the mixing apparatus 28 to produce the reaction product of the binder composition. It is to be appreciated that the step of mixing the first and second components may be further defined as mixing the first and second components with the mixer 30 to produce the reaction product of the binder composition. The method further comprises the step of applying the reaction product of the binder composition to the aggregate within the mixing apparatus 28 at an application rate to produce the composite material.

In another embodiment, the method of using the mixing system 20 comprises the steps of providing the aggregate into the aggregate vessel 22, providing the first component into the first vessel 24, and providing the second component into the second vessel 26. The method may further comprise the step of transporting the first and second components from the first and second vessels 24, 26 into the mixer 30 of the mixing apparatus 28 and mixing the first and second components to produce the reaction product of the binder composition. The method may further comprise the step of transporting the aggregate with the conveyer 44 from the aggregate vessel 22 into the channel at the delivery rate and operating the pumps 27 with the controller 46 to control an application rate of the binder composition dependent on the delivery rate of the aggregate transported into the channel. The method may further comprise the step of applying the reaction product of the binder composition to the aggregate within the channel at the application rate to produce the composite material rotating the auger 42 to mix the composite material and dispense the composite material from the channel, and curing the composite material.

In any of the embodiments above, the method of using the mixing system may further include one or more of the following steps: rotating the auger 42 to mix the composite material and dispense the composite material from the channel and transporting the aggregate from the aggregate vessel 22 into the channel at the delivery rate; controlling the application rate of the reaction product of the binder composition to the aggregate within the channel dependent on the delivery rate of the aggregate into the channel, wherein this step may be further defined as controlling the application rate of the reaction product of the binder composition within the ranges described above; controlling the delivery rate of the aggregate into the channel with the controller 46; and transporting the additive component into the mixer 30 and mixing the additive component with the first and second components.

A typical method of paving a defined area with a composite material to form a paved structure within the defined area using a mixing system 20 will now be described. For this method, the paved structure is typically a sidewalk or a roadway. The method comprises the steps of using the mixing system 20, providing the aggregate in the aggregate vessel 22, providing the first component in the first vessel 24, and providing the second component in the second vessel 26. The method also comprises the steps of transporting the first and second components from the first and second vessels 24, 26 into the mixer 30 of the mixing apparatus 28 and mixing the first and second components to produce the reaction product of the binder composition. The method further comprises the steps of transporting the aggregate with the conveyer 44 from the aggregate vessel 22 into the channel at a delivery rate and operating the pumps 27 with the controller 46 to control an application rate of the binder composition dependent on the delivery rate of the aggregate transported into the channel. The method further comprises the steps of applying the reaction product of the binder composition to the aggregate within the channel at the application rate to produce the composite material and rotating the auger 42 to mix the composite material. The method further comprises the steps of dispensing the composite material from the channel and curing the composite material to form the paved structure. It is to be appreciated that the step of dispensing the composite material from the channel can be further defined as dispensing the composite material from the channel directly into the defined area and/or dispensing the composite material from the channel into a container. Examples of suitable containers include, but are not limited to, wheelbarrows, cement trucks, etc.

The method of paving may further comprise the step of positioning forms to define a perimeter of the defined area prior to the step of dispensing the composite material from the channel directly into the defined area. The method of paving may further comprise the step of removing the forms after the step of curing the composite material to form the paved structure. Suitable forms, for purposes of the present invention, include conventional forms known to those skilled in the construction art, such as forms formed from metal and/or wood.

In addition, the method of paving may further comprise one or more of the following steps: transporting the composite material within the container to the defined area after the step of dispensing the composite material from the channel into the container and prior to the step of curing the composite material to form the paved structure; dispensing the composite material from the container directly into the defined area after the step of transporting the composite material within the container to the defined area; and positioning the forms to define the perimeter of the defined area prior to the step of transporting the composite material into the defined area and prior to performing the step of curing the composite material to form the paved structure.

Modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention may only be determined by studying the following claims.

What is claimed is:

1. A method of producing a composite material, the composite material comprising an aggregate and a reaction product of a two-component polymeric binder composition comprising a first component and a second component, the method employing a mixing system comprising an aggregate vessel comprising the aggregate, a first vessel comprising the first component, a second vessel comprising the second component, and a mixing apparatus comprising a mixer and an auger rotatably disposed within a channel, wherein the mixing apparatus is in communication with the aggregate vessel, the first vessel, and the second vessel, the method comprising:
   (a) delivering the aggregate into the channel of the mixing apparatus at a delivery rate;
   (b) delivering the first and second components into the mixer of the mixing apparatus;
   (c) mixing the first and second components in the mixer of the mixing apparatus independent of the aggregate to obtain the reaction product of the two-component polymeric binder composition; and
   (d) contacting the reaction product of the two-component polymeric binder composition with the aggregate within the channel of the mixing apparatus at an application rate to obtain the composite material.

2. The method of claim 1, wherein the mixing apparatus further comprises:
   a housing defining the channel, with the channel in communication with the mixer and the aggregate vessel and the method further comprises rotating the auger to mix the composite material and dispense the composite material from the channel;
   a conveyer disposed between the aggregate vessel and the mixing apparatus, and the method further comprises transporting the aggregate from the aggregate vessel into the channel at the delivery rate;
   a first pump in fluid communication with the first vessel and a second pump in fluid communication with the second vessel, wherein each of the pumps is also in fluid communication with the mixer; and
   a controller in communication with the pumps, and the method further comprises controlling the application rate of the reaction product of the two-component polymeric binder composition to the aggregate within the channel based on the delivery rate of the aggregate into the channel;
   wherein a portable platform comprises the aggregate vessel, the first vessel, the second vessel and the mixing apparatus.

3. A method of paving a defined area with a composite material to form a paved structure within the defined area, the composite material comprising an aggregate and a reaction product of a two-component polymeric binder composition comprising a first component and a second component, the method employing a mixing system comprising an aggregate vessel comprising the aggregate, a first vessel comprising the first component, a second vessel comprising the second component, and a mixing apparatus comprising:
   a mixer in fluid communication with the first vessel and the second vessel;
   a first pump in fluid communication with the first vessels; and a second pump in fluid communication with the second vessel, wherein each of the pumps is also in fluid communication with the mixer;
   a housing defining a channel in communication with the aggregate vessel and the mixer;
   a conveyer disposed between the aggregate vessel and the mixing apparatus;
   a controller in communication with the conveyer and the pumps; and
   an auger rotatably disposed within the channel;
the method comprising:
   (i) transporting the first and second components from the first and second vessels into the mixer;
   (ii) mixing the first and second components independent of the aggregate to obtain the reaction product of the two-component polymeric binder composition;
   (iii) transporting the aggregate from the aggregate vessel into the channel at a delivery rate with the conveyor;
   (iv) transferring the reaction product of the two-component polymeric binder composition from the mixer to the channel;
   (v) operating the pumps with the controller to control an application rate of the two-component polymeric binder composition based on the delivery rate of the aggregate transported into the channel;

(vi) contacting the reaction product of the two-component polymeric binder composition with the aggregate within the channel at the application rate to obtain the composite material;

(vii) rotating the auger to mix the composite material;

(viii) dispensing the composite material from the channel; and (ix) curing the composite material to form the paved structure.

4. The method of claim 1, wherein the first component is an epoxy resin and the second component is a hardener.

5. The method of claim 1, wherein the first component is an isocyanate and the second component is an isocyanate-reactive component.

6. The method of claim 5, wherein the isocyanate-reactive component is an alcohol, an amine, or both.

7. The method of claim 1, wherein the aggregate is about 1 to 99% by weight glass and about 1 to 99% by weight rock each based on the weight of the aggregate.

8. The method of claim 7, wherein the aggregate has an average diameter of about ⅛ to about ¼ of an inch.

9. The method of claim 1, wherein the aggregate comprises crumb rubber.

10. The method of claim 1, wherein the aggregate comprises rock.

11. The method of claim 3, wherein the dispensing (viii) further comprises dispensing the composite material from the channel directly into the defined area.

12. The method of claim 11, comprising a plurality of forms, and the method further comprises positioning the forms to define a perimeter of the defined area prior to dispensing (viii) the composite material from the channel directly into the defined area.

13. The method of claim 3, wherein the dispensing (viii) further comprises dispensing the composite material from the channel into a container.

14. The method of claim 13, further comprising:
transporting the composite material within the container to the defined area after dispensing (viii) the composite material from the channel into the container and prior to curing (ix) the composite material to form the paved structure; and
dispensing the composite material from the container directly into the defined area after transporting the composite material within the container to the defined area.

15. The method of claim 14, comprising a plurality of forms and the method further comprising positioning the forms to define a perimeter of the defined area prior to transporting the composite material into the defined area and prior to curing (ix) the composite material to form the paved structure.

16. The method of claim 3, wherein the paved structure is a sidewalk or a roadway.

17. A method of producing a composite material, the composite material comprising an aggregate and a reaction product of a two-component polymeric binder composition comprising an isocyanate and a polyol wherein the polyol is in the binder composition in an amount of from about 30 to about 120 parts by weight based on 100 parts by pre-reaction weight of all components in the binder composition except the isocyanate component and wherein the reaction product is the reaction product of the isocyanate and polyol, the method employing a mixing system comprising an aggregate vessel comprising the aggregate, a first vessel comprising the first component, a second vessel comprising the second component, and a mixing apparatus comprising a mixer and an auger rotatably disposed within a channel, wherein the mixing apparatus is in communication with the aggregate vessel, the first vessel, and the second vessel, the method comprising:

(a) delivering the aggregate into the channel of the mixing apparatus at a delivery rate;

(b) delivering the first and second components into the mixer of the mixing apparatus;

(c) mixing the first and second components in the mixer of the mixing apparatus independent of the aggregate to obtain the reaction product of the two-component polymeric binder composition; and (d) contacting the reaction product of the two-component polymeric binder composition with the aggregate, such that the aggregate directly contacts the reaction product, within the channel of the mixing apparatus at an application rate to obtain the composite material.

18. The method of claim 1, wherein in step (d), the aggregate is coated with a uniform coating of the reaction product of the two-component polymeric binder composition.

* * * * *

UNITED STATES PATENT AND TRADEMARK OFFICE
CERTIFICATE OF CORRECTION

| | | |
|---|---|---|
| PATENT NO. | : 9,464,003 B2 | Page 1 of 1 |
| APPLICATION NO. | : 13/380327 | |
| DATED | : October 11, 2016 | |
| INVENTOR(S) | : Steven Hicks et al. | |

It is certified that error appears in the above-identified patent and that said Letters Patent is hereby corrected as shown below:

In the Claims

Claim 1, Column 14, Lines 4 and 5, after "aggregate" and before "within", please add --, such that the aggregate directly contacts the reaction product,--

Claim 3, Column 15, Lines 4 and 5, after "aggregate" and before "within", please add --, such that the aggregate directly contacts the reaction product,--

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*